United States Patent
Alonazy

(10) Patent No.: US 8,967,192 B2
(45) Date of Patent: Mar. 3, 2015

(54) METHOD AND DEVICE FOR WATER RATIONING

(76) Inventor: Yousef Dhani Alonazy, Indiana, PA (US)

( * ) Notice: Subject to any disclaimer, the term of this patent is extended or adjusted under 35 U.S.C. 154(b) by 381 days.

(21) Appl. No.: 13/532,280

(22) Filed: Jun. 25, 2012

(65) Prior Publication Data

US 2013/0340833 A1 Dec. 26, 2013

(51) Int. Cl.
*F16K 31/12* (2006.01)
*F16K 31/36* (2006.01)
*F17D 3/01* (2006.01)
*G05D 7/00* (2006.01)
*G05D 11/00* (2006.01)
*F16L 11/12* (2006.01)
*F16L 11/00* (2006.01)
*H01B 7/00* (2006.01)
*H01B 17/00* (2006.01)
*F16K 31/48* (2006.01)
*F17D 3/00* (2006.01)

(52) U.S. Cl.
CPC .............................. *F17D 3/01* (2013.01)
USPC .......... 137/487.5; 700/282; 174/47; 138/138; 137/624.11

(58) Field of Classification Search
CPC ........................................................ F17D 3/01
USPC ............ 137/487.5, 488, 560, 624.12; 174/47; 700/282

See application file for complete search history.

(56) References Cited

U.S. PATENT DOCUMENTS

| 5,139,044 A * | 8/1992 | Otten et al. ..................... 137/80 |
| 6,147,931 A * | 11/2000 | Seaman et al. ................ 367/153 |
| 6,209,576 B1 * | 4/2001 | Davis .......................... 137/487.5 |
| 6,237,618 B1 * | 5/2001 | Kushner .......................... 137/1 |
| 6,305,427 B1 * | 10/2001 | Priest, II ....................... 138/125 |
| 7,406,363 B2 * | 7/2008 | Doering et al. ............... 700/284 |
| 7,592,921 B2 | 9/2009 | Young |
| 7,758,315 B2 | 7/2010 | Moskun |
| 7,970,558 B1 | 6/2011 | Roys |
| 2001/0032674 A1 * | 10/2001 | Brunet et al. .............. 137/487.5 |

(Continued)

FOREIGN PATENT DOCUMENTS

WO    WO 2006/116241 A1    11/2006

OTHER PUBLICATIONS

Cellphonebeat, Posted by: Dakshina Thakur, 2 months ago, "Best smartphone apps to help monitor energy usage", pp. 1-4, www.cellphonebeat.com/10-smartphone-apps-monitor-energy-usage.html.

*Primary Examiner* — Craig Schneider
*Assistant Examiner* — Josephine Trinidad-Borges
(74) *Attorney, Agent, or Firm* — Oblon, McClelland, Maier & Neustadt, L.L.P.

(57) ABSTRACT

A water rationing device that controls and manages municipal household water usage including a signal conveying wired pipe having electrically conductive wires, a flow sensor coupled to the signal conveying wired pipe, a flow gauge, a first and a second control valve coupled to the signal conveying wired pipe, a first and a second pipe connector having push connectors, a converter connected to the electrically conductive wires via the push connectors, a power supply connected to the converter, and a first and a second transceiver connected to a controller that receives the water flow signal from the water flow gauge, sends and receives control signals to the first control valve and the second control valve, and sends and receives signals from the first and second transceiver.

13 Claims, 14 Drawing Sheets

(56) References Cited

U.S. PATENT DOCUMENTS

| | | | |
|---|---|---|---|
| 2003/0167919 A1* | 9/2003 | Schempf | 95/15 |
| 2003/0178070 A1* | 9/2003 | Glicken | 137/624.11 |
| 2004/0128034 A1* | 7/2004 | Lenker et al. | 700/282 |
| 2008/0149180 A1* | 6/2008 | Parris et al. | 137/1 |
| 2009/0193886 A1 | 8/2009 | Walkin | |
| 2010/0324744 A1* | 12/2010 | Cox | 700/284 |
| 2011/0074601 A1 | 3/2011 | Cornwall | |
| 2011/0284777 A1 | 11/2011 | Pitchford et al. | |

* cited by examiner

| Water Level(x) | Flow Rate Setting | Control Valve One Status | Control Valve Two Status | Data Center's Suggested Flow Rate for Control Valve Two |
|---|---|---|---|---|
| 80% < X < 100% | Auto | 100% Open | 100% Open | - |
|  | Manual | 100% Open | Consumer Defined | 100% Open |
| 60% < X < 80% | Auto | 80% Open | 100% Open | - |
|  | Manual | 100% Open | Consumer Defined | 80% Open |
| 40% < X < 60% | Auto | 60% Open | 100% Open | - |
|  | Manual | 100% Open | Consumer Defined | 60% Open |
| 20% < X < 40% | Auto | 40% Open | 100% Open | - |
|  | Manual | 100% Open | Consumer Defined | 40% Open |
| 1% < X < 20% | Auto | 20% Open | 100% Open | - |
|  | Manual | 100% Open | Consumer Defined | 20% Open |
| X < 1% | Auto | Closed | 100% Open | - |
|  | Manual | 100% Open | Consumer Defined | - |

FIG. 17

METHOD AND DEVICE FOR WATER RATIONING

GRANT OF NON-EXCLUSIVE RIGHT

This application was prepared with financial support from the Saudi Arabian Cultural Mission, and in consideration therefore the present inventor has granted The Kingdom of Saudi Arabia a non-exclusive right to practice the present disclosure.

BACKGROUND

1. Field of the Disclosure

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The present disclosure relates to a water rationing device and a control method thereof, and more particularly, to a water rationing device and a control method for controlling and managing municipal household water usage.

2. Description of Related Art

Water scarcity has been among the main problems throughout the history of human civilization. Despite the existence of numerous water sources on the planet earth, availability of clean and drinkable water has been one of the crucial survival factors for a greater part of the world's population. Although the water scarcity problem is more noticeable in water poor countries, it is not particularly limited to such water poor countries. Uneven distribution of water, inefficiency of water harvesting and delivery systems, increased water consumption per person, and lack of solid usage control systems have resulted in water usage rate to grow at a greater rate than the rate of human population increase. The water scarcity problem also is a major concern for water rich countries in a long term.

As water scarcity increases, the cost of water also increases. For example, in dry countries, such as Saudi Arabia, the cost of clean water can exceed the cost of oil due to the limited supplies of clean water. Additionally, such limited supplies of clean water can not be easily sustained or replaced. As a result, various approaches have been utilized for water resources management. For example, water rationing has been a common practice to enforce fair distribution of the limited supply of water among the consumers. On the other hand, increasing awareness among the water consumers with regards to the water scarcity problem has been an alternative approach to encourage more responsible water usage.

BRIEF SUMMARY

In view of the water scarcity problem noted above, the present disclosure aims to provide a water rationing device that is used to manage the daily water usage of consumers via a network while providing the consumer with an opportunity to monitor and control the water usage.

BRIEF DESCRIPTION OF THE DRAWINGS

FIG. 17 is a chart of parameters for the water rationing device in accordance with the present disclosure.

DETAILED DESCRIPTION

Figure 1:
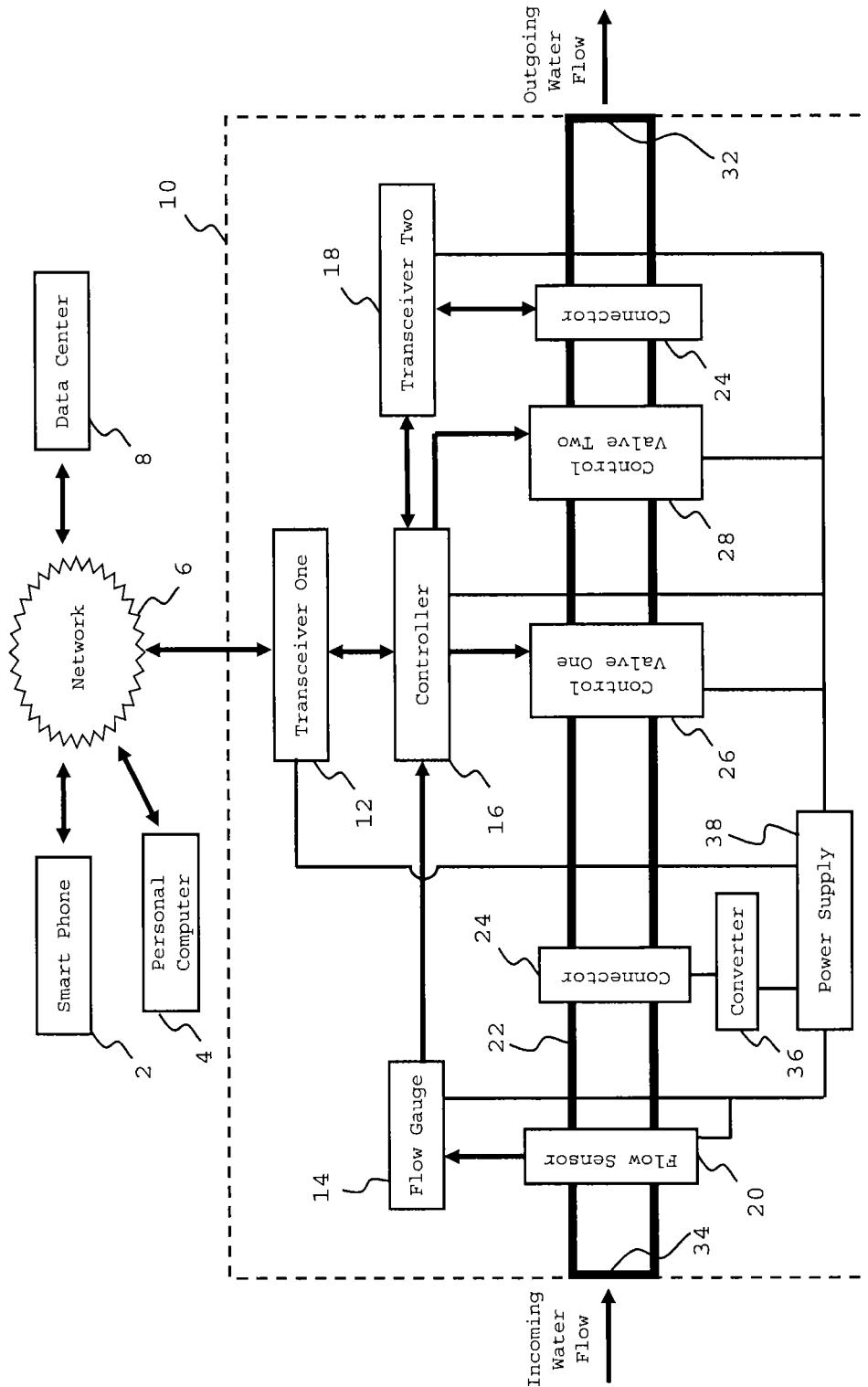
FIG. 1 is a schematic of a water rationing device communicating with a data center, a smart phone, and a personal computer via a network in accordance with the present disclosure.

A water rationing device 10 helps to solve the problem of water scarcity by monitoring water usage and responding to control signals from a data center 8, such that the data center 8, based on water availability in a water reservoir 106, manages the volume of water allocated to each house 101. One embodiment of the water rationing device 10 is illustrated in FIG. 1 that is used to control and manage the water flow to a house 101. The embodiment of the water rationing device 10 includes a signal conveying wired pipe 22 that has a water inlet 34 at one end and a water outlet 32 at another end; a control valve one 26, a control valve two 28, a flow sensor 20, and a flow gauge 14 that are placed along the signal conveying wired pipe 22; two signal conveying wired pipe connectors 24 of the same type placed along the signal conveying wired pipe 22 that are used to make electrical connection to the signal conveying wired pipe 22 via push connectors 801; a controller 16 that is connected to a transceiver one 12, a transceiver two 18, the control valve one 26, the control valve two 28, and the flow gauge 14; and a converter 36, and a power supply 38 that are connected to the flow sensor 20, the flow gauge 14, the transceiver one 12, the transceiver two 18, the controller 16, the control valve one 26, the control valve two 28, and the two signal conveying wired pipe connectors 24. The transceiver one 12 is connected to at least one of a smart phone 2, a personal computer 4, and the data center 8 via a network 6. The water rationing device 10 communicates with the data center 8, the personal computer 4, or the smart phone 2 via the transceiver one 12. The network 6 can be a wired or a wireless network.

Incoming water from a municipal water distribution pipeline enters the water rationing device 10 via the water inlet 34 and exits the water rationing device 10 from the water outlet 32. The outgoing water flow from the water outlet 32 then enters water distribution pipeline of house 124.

The control valve one 26 and control valve two 28 are both electrically actuated liquid flow valves that are independently controlled by the controller 16. Various types of electrically actuated flow valves, such as diaphragm valve, ball valve, gate valve, or butterfly valve can be used as the control valve one 26 and the control valve two 28, as such, operation of the water rationing device 10 is independent of the type of the control valve one 26 and the control valve two 28.

Figure 2:
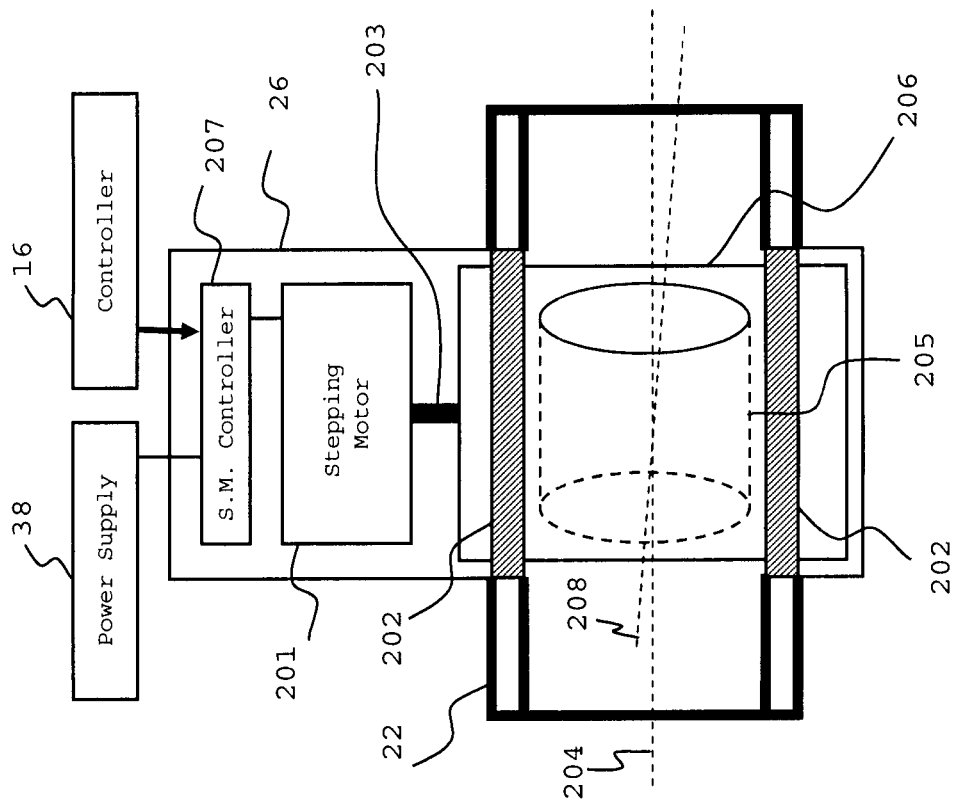
FIG. 2 is an exemplary control valve used in the water rationing device in a fully closed position in accordance with the present disclosure.
Figure 3:
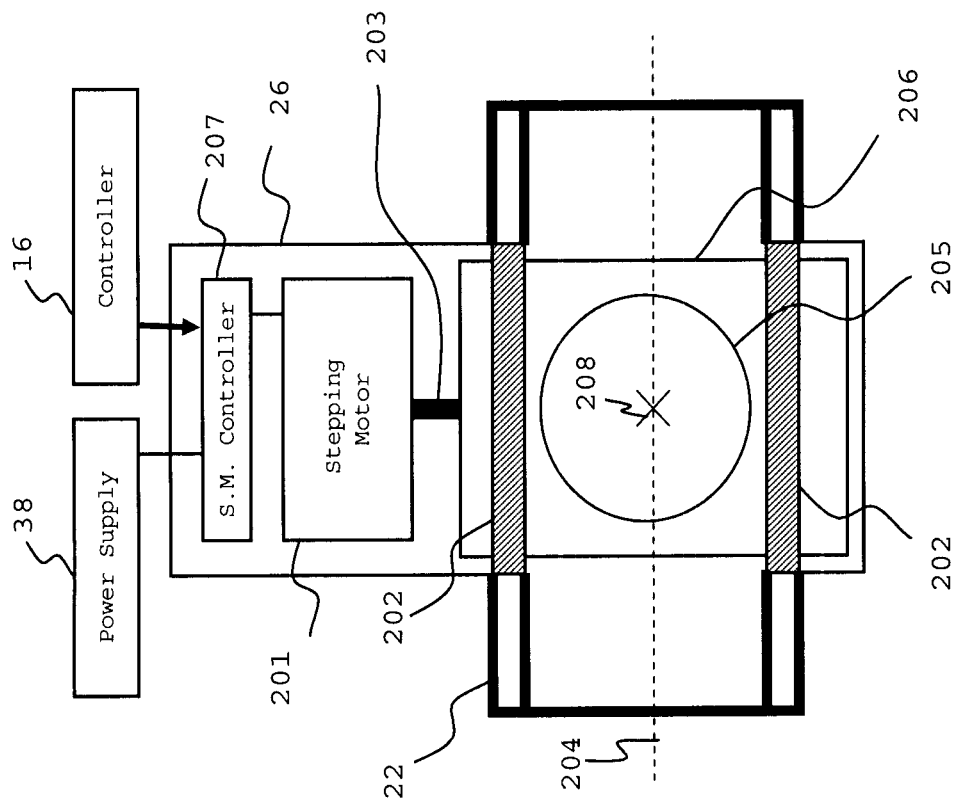
FIG. 3 is an exemplary control valve used in the water rationing device in a partially open position in accordance with the present disclosure.

FIG. 2 and FIG. 3 describe an embodiment of the control valve one 26 and control valve two 28 in two different positions: fully closed and partially open. In this embodiment, the controller 16 is connected to a stepping motor controller 207 that is connected to a stepping motor 201 having a stepping motor rotating shaft 203. The stepping motor controller 207 controls the stepping motor 201 according to the control signals received from the controller 16. In this embodiment, the stepping motor rotating shaft 203 is connected to a rotating cylinder 206 that has a water passage orifice 205 inside. The water passage orifice 205 is a cylindrical empty orifice inside the rotating cylinder 206 that has a water passage orifice axis 208 presented in FIG. 2 as a cross for more clarity, meaning the water passage orifice axis 208 is perpendicular to the surface that FIG. 2 is illustrated on.

Additionally, a signal conveying wired pipe longitudinal axis 204 is presented with a dotted line. When the water passage orifice axis 208 is perpendicular to the signal conveying wired pipe longitudinal axis 204, as shown in FIG. 2, the water flow is blocked, i.e. the control valve 26 is fully closed. On the other hand, when the axis of the water passage orifice 208 is parallel to the signal conveying wired pipe longitudinal axis 204, the control valve 26 is fully open. Rotation of the rotating cylinder 206 along the stepping motor rotating shaft 203 adjusts the flow of water passing through the water passage orifice 205. Therefore, the control valve 26 can adjust the flow of water by adjusting the rotating cylinder 206. For example, FIG. 3 illustrates the control valve 26 when it is partially open. Rotating cylinder o-rings 202 are used for sealing to prevent water leak. Electrical power for operation of the stepping motor 201 and the stepping motor controller 207 is supplied by the power supply 38. Alternatively, the power can be supplied from the controller 16 to the stepping motor 201 and the stepping motor controller 207.

Figure 4:
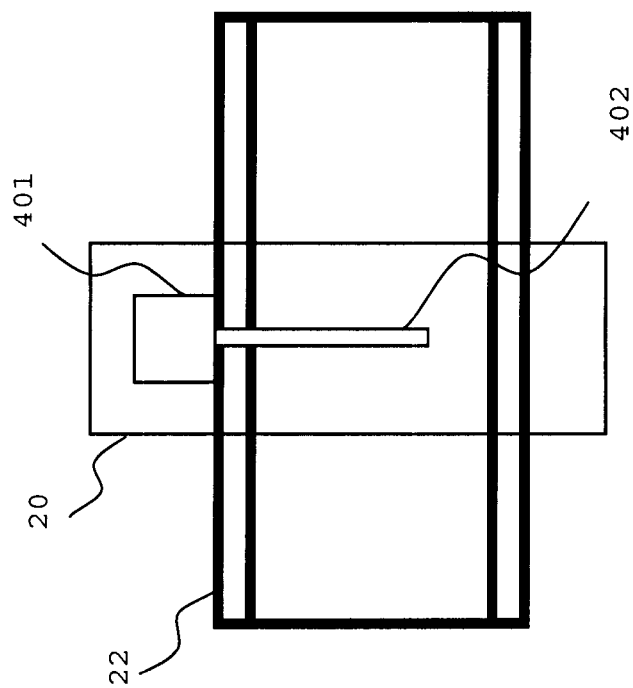
FIG. 4 is an exemplary flow sensor used in the water rationing device in accordance with the present disclosure.

An embodiment of the flow sensor 20 that senses the flow of the water is illustrated in FIG. 4. In this embodiment, a needle-type flow sensor 402 senses the water flow and sends the read-out signal through a needle-type sensor connector 401 to the flow gauge 14. Various types of flow sensors using different mechanisms for flow measurement, such as mechanical, pressure-based, optical, or thermal mass low meters can be used as the flow sensor 20, as such, operation of the water rationing device 10 is independent of the type of the flow sensor 20.

Figure 6:
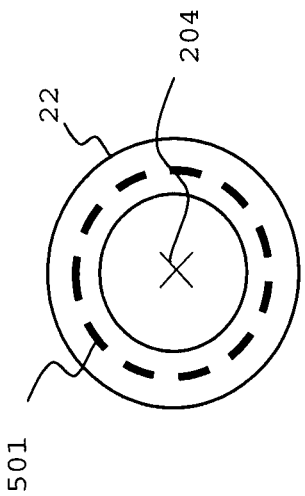
FIG. 6 is a cross section view of the signal conveying wired pipe used in the water rationing device in accordance with the present disclosure.
Figure 5:
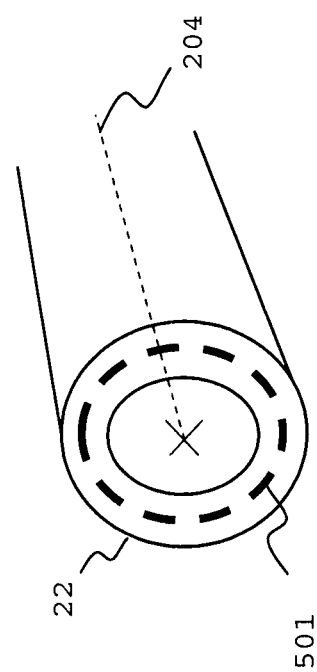
FIG. 5 is a perspective view of a signal conveying wired pipe used in the water rationing device in accordance with the present disclosure.
Figure 7:
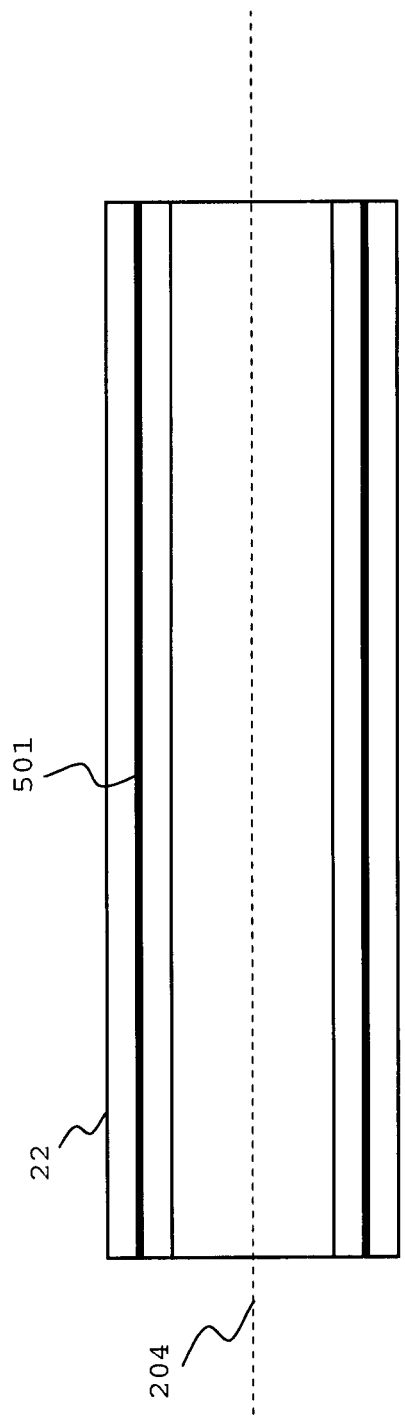
FIG. 7 is a cross section view of the signal conveying wired pipe used in the water rationing device in accordance with the present disclosure.

The signal conveying wired pipe 22 used in the water rationing device is shown in FIG. 5, FIG. 6, and FIG. 7. The signal conveying wired pipe 22 is made of a dielectric material that is not electrically conductive. The signal conveying wired pipe 22 includes flat electrical wires 501 that are distributed parallel to the signal conveying wired pipe longitudinal axis 204 inside the signal conveying wired pipe 22. Such implementation of flat electrical wires 501 inside the signal conveying wired pipe 22 allows the signal conveying wired pipe 22 to have dual usage: 1) as a pipe to provide a path for water flow, and 2) as a wire to provide a path for electricity.

Figure 9:
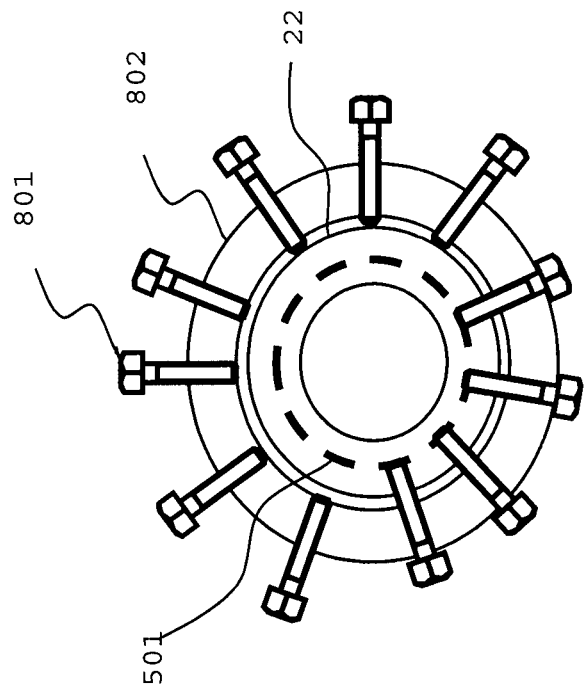
FIG. 9 is a cross section view of the signal conveying wired pipe connector used with the signal conveying wired pipe when the signal conveying wired pipe connector is electrically connected to the signal conveying wired pipe through four push connectors in accordance with the present disclosure.
Figure 8:
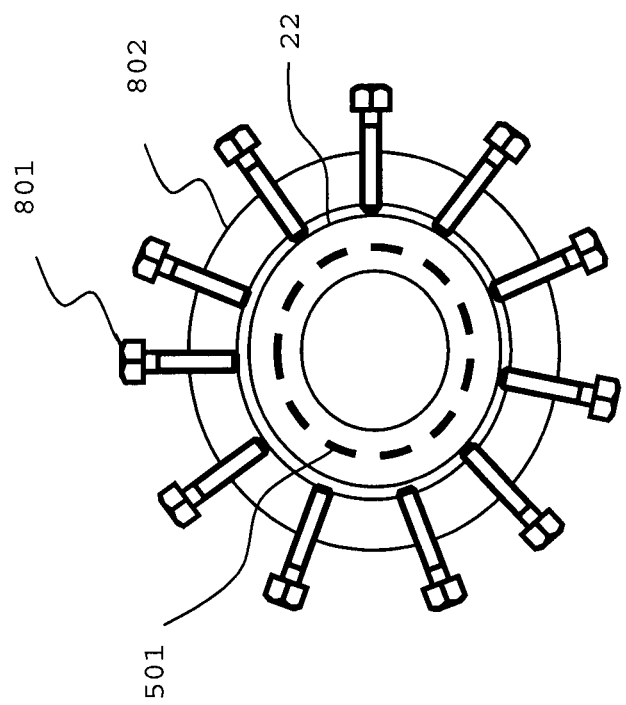
FIG. 8 is a cross section view of a signal conveying wired pipe connector used with the signal conveying wired pipe when the signal conveying wired pipe connector is not electrically connected to the signal conveying wired pipe in accordance with the present disclosure.

Electrical connection to the signal conveying wired pipe 22 is made using the signal conveying wired pipe connector 24. The signal conveying wired pipe connector 24 includes a ring structure 802 with a plurality of push connectors 801 around it as shown in FIG. 8. In order to make electrical connection to the signal conveying wired pipe 22, the signal conveying wired pipe 22 is placed inside the ring structure 802, and one or more of the push connectors 801 is fastened to dig through the signal conveying wired pipe 22 and reach the flat electrical wires 501. For example, FIG. 9 shows the signal conveying wired pipe connector 24 where four of the push connectors 801 are connected to the flat electrical wires 501. Push connectors 801 can have a conductive inner portion surrounded by an insulator, although the bottom of the push connector 801 is exposed so as to make electrical contact with the flat electrical wires 501. The push connectors 801 can have variety of shapes and need not necessarily in screw-shaped. Additionally, the push connectors 801 and the signal conveying wired pipe 22 can be color-coded. For example, each push connector 801 and the corresponding flat electrical wire 501 can be colored a same color, providing a one-to-one relation. Such color-coding can be used to differentiate between the flat electrical wires 501 that are used for conveying the control signals and the electrical power.

Figure 10:
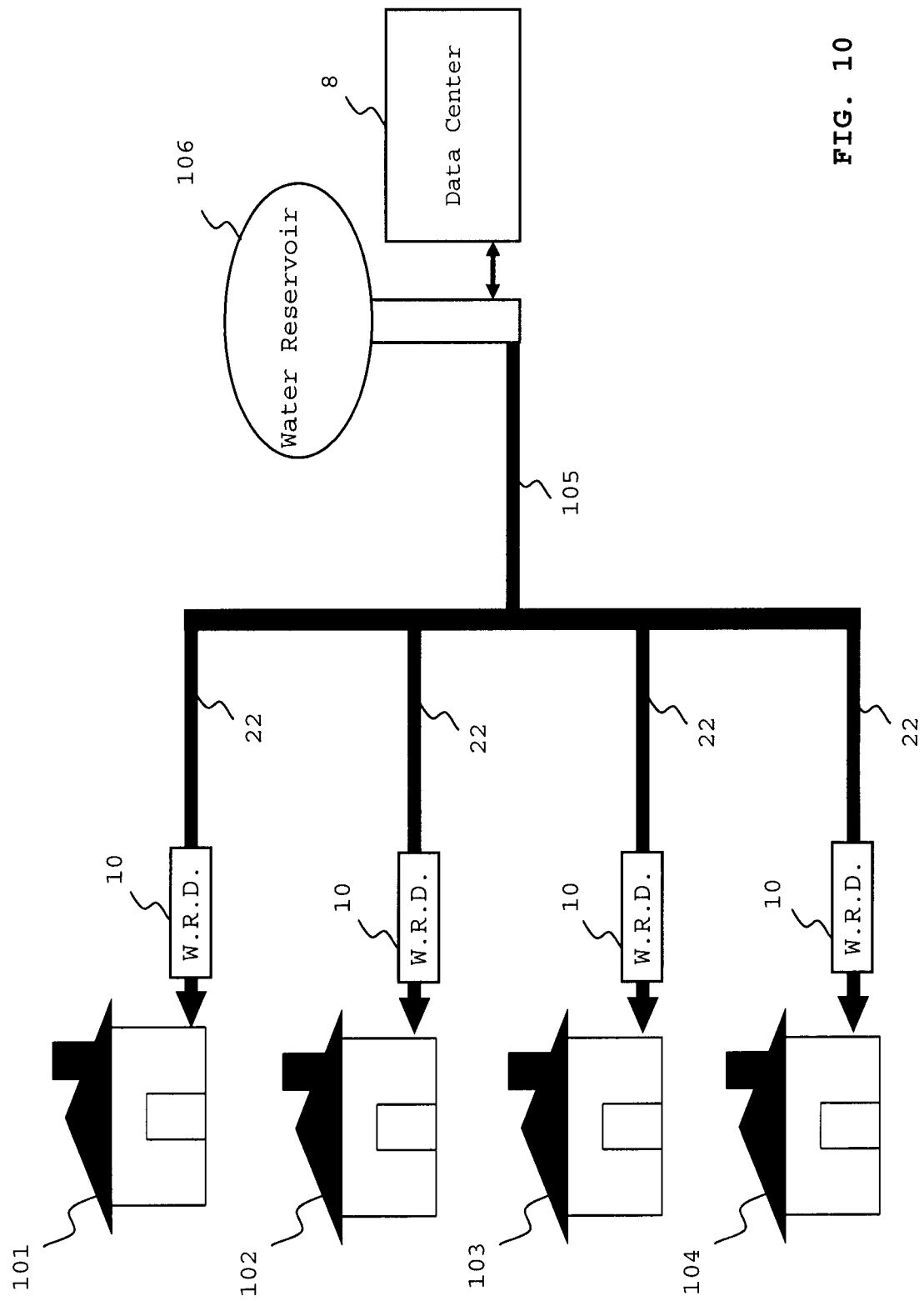
FIG. 10 is an exemplary placement of a plurality of water rationing devices in a plurality of houses and a main pipeline that is responsible for water distribution from a water reservoir to the plurality of houses in accordance with the present disclosure.

FIG. 10 illustrates an example of a plurality of water rationing devices 10 placed between the water reservoir 106 and a plurality of houses 101, 102, 103, and 104. FIG. 10 illustrates that the water flow is directed via a main pipeline 105 to the signal conveying wired pipe 22 and the water passes though the water rationing device 10 before being supplied to each house 101, 102, 103, and 104. The water reservoir 106 is used as an example of a water supply and any type of water supply can be used instead of the water reservoir 106, i.e. functionality of the water rationing device is independent of the water source.

Figure 11:
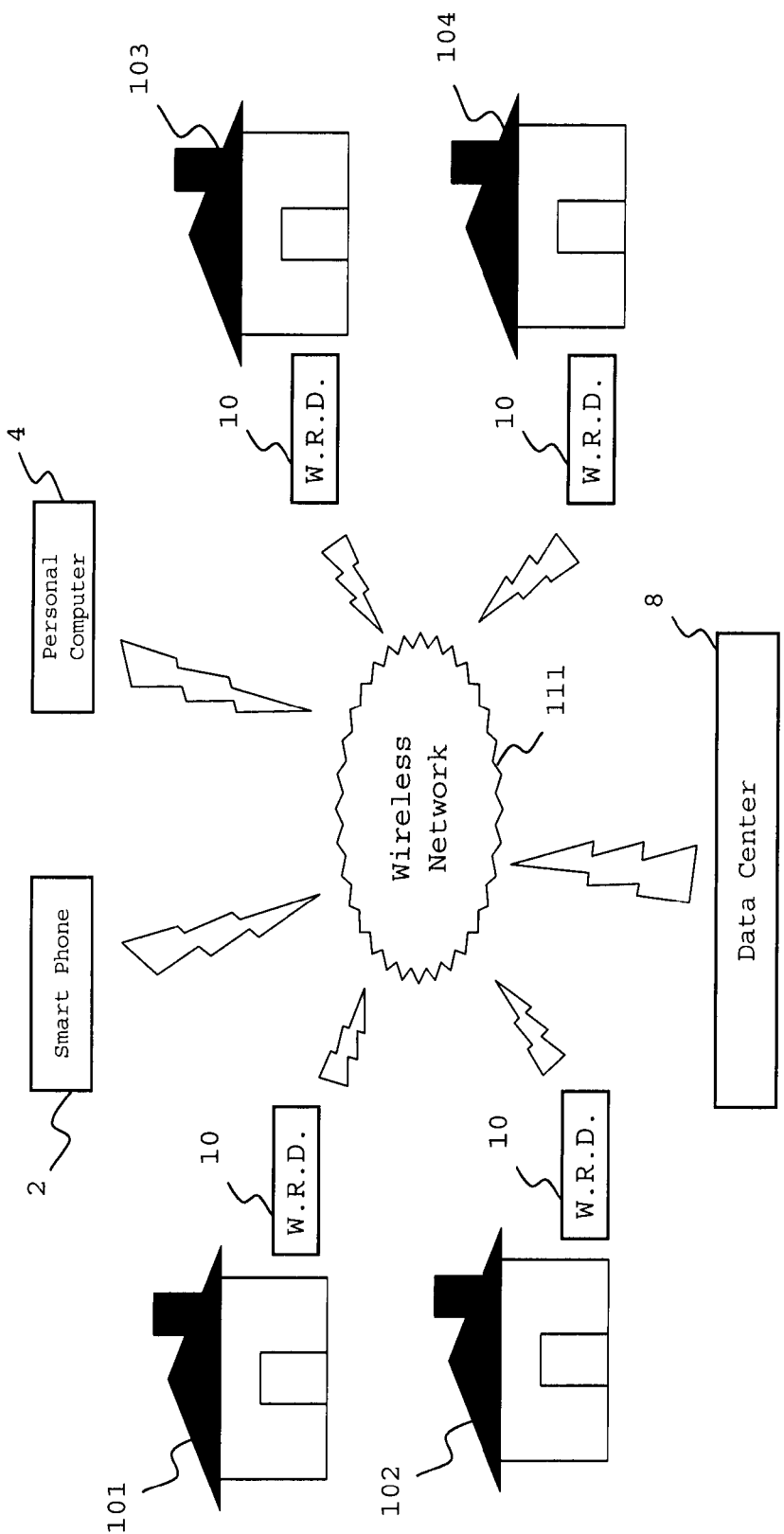
FIG. 11 is a plurality of houses with a plurality of water rationing devices that are connected to a data center, a smart phone, and a personal computer via a wireless network in accordance with the present disclosure.

FIG. 11 illustrates an example of the plurality of water rationing devices 10 that are assigned to a plurality of houses 101, 102, 103, and 104, and that are connected to a wireless network 111 via the transceiver one 12. Such wireless connection through a wireless network 111 enables sending and receiving wireless signals between the water rationing device 10, the smart phone 2, the personal computer 4, and the data center 8. It should be noted that more than a single smart phone 2, personal computer 4, or data center 8 can be connected to the wireless network 111.

Figure 12:
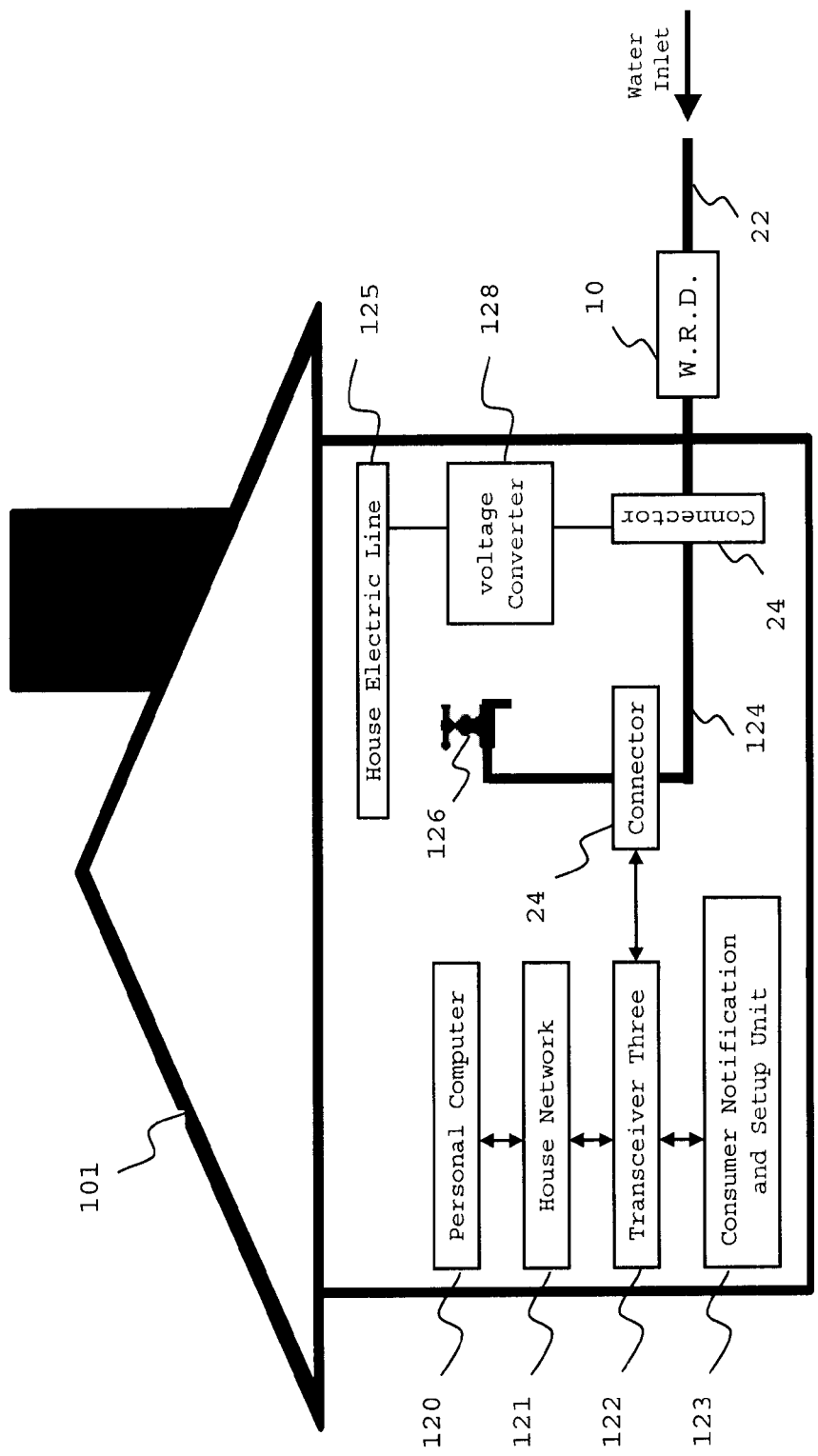
FIG. 12 is an example of connecting the water rationing device to a house electric line, a personal computer, and a consumer notification and setup unit via a signal conveying wired pipe inside a house in accordance with the present disclosure.

FIG. 12 illustrates implementation of the water rationing device 10 inside the house 101. The water rationing device 10 is connected in series to the signal conveying wired pipe 22 that delivers water into the house 101 and distributes water in various locations inside the house 101. For example, as illustrated in FIG. 12, the water flow is delivered through the signal conveying wired pipe 22 inside the house 101 and a consumer can have access to the water flow via a water faucet 126 that is connected to the signal conveying wired pipe 22 inside the house 101. In this exemplary illustration, for operation of the water rationing device 10, the electrical power is supplied from the house electric line 125 to a voltage converter 128 that converts the voltage of the house electric line 125. The voltage converter 128 is connected to the water rationing device 10 via the signal conveying wired pipe connector 24 and the flat electrical wires 501 inside the signal conveying wired pipe 22. It should be noted that FIG. 12 illustrates an example where the house electrical line 125 supplies the electrical power required to operate the water rationing device 10. However, the water rationing device 10 can operate with alternative power supplies, such as an internal backup battery or a solar cell. The voltage converter 128 converts the voltage of the house electric line 125 to a voltage that is suitable for transmission via the signal conveying wired pipe 22. For example, the voltage converter 128 may convert a DC voltage to an AC voltage, may convert and AC voltage to a DC voltage, may convert a DC voltage to another DC voltage, or may convert an AC voltage to another AC voltage. The house electric line 125 can be any power supply that is used to supply the electricity of the house 101 or it can be a power supply that is designated to supply electricity only for the water rationing device 10.

The exemplary implementation of the water rationing device 10 inside the house 101, as illustrated in FIG. 12, uses the signal conveying wired pipe 22 for water distribution inside the house 101. However, regular plastic and metal pipes can also be used for water distribution inside the house 101. In this case, the regular plastic and metal pipes can not be used for conveying the control signals and wiring is needed to provide electrical path for the control signals and the electrical power. As an alternative, the transceiver one 12 can use wireless communication to send and receive the control signals where the signal conveying wired pipes 22 are not used.

Further, FIG. 12 illustrates that a consumer notification and setup unit 123 is connected to a transceiver three 122 that can send and receive signals via the signal conveying wired pipe 22 to the water rationing device 10. The signal conveying wired pipe connectors 24 provide the electrical connection to the flat electrical wires 501 inside the signal conveying wired pipe 22 that is used to make electrical connection between the transceiver three 122 and the water rationing device 10. Similarly, a personal computer 120 is connected to a house network 121 that is connected to the transceiver three 122. The transceiver three 122 simultaneously can serve multiple devices for communicating with the water rationing device 10, such as multiple personal computers 120 (via the house network 121), and multiple consumer notification and setup units 123. Additionally, it should be noted that the house network 121 can be a wired or wireless network that is connected to at least internet, a network or a smart phone. Further, it should be noted that the connection between the transceiver three 122 and the above mentioned devices that communicate with the water rationing device 10 via the transceiver three 122 can be wired or wireless. In addition, the connection between the transceiver three 122 and the transceiver one 12 also can be wired or wireless. Also, it should be noted that a house 101 may include more than one transceiver three 122 and more than one consumer notification and setup unit 123 to provide an easy access for consumers at different locations inside the house 101.

Figure 13:
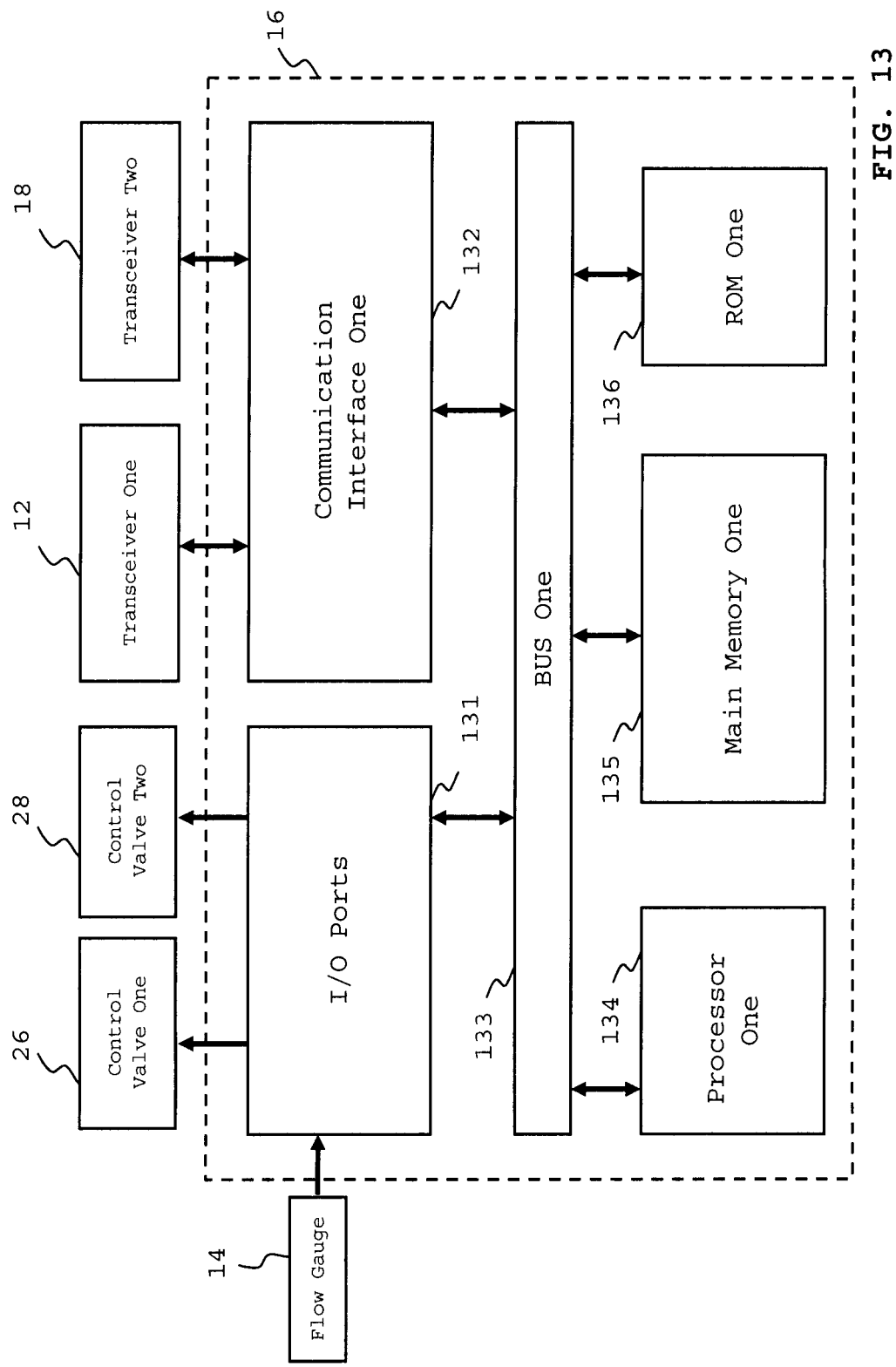
FIG. 13 is a block diagram of a controller used in the water rationing device in accordance with the present disclosure.

FIG. 13 illustrates the controller 16 in more details upon which an embodiment of the present disclosure may be implemented. The controller 16 includes a bus one 133 or other communication mechanism for communicating information, and a processor one 134 coupled with the bus one 133 for processing the information. The controller 16 also includes a main memory one 135, such as a random access memory (RAM) or other dynamic storage device (e.g., dynamic RAM (DRAM), static RAM (SRAM), and synchronous DRAM (SDRAM)), coupled to the bus one 133 for storing information and instructions to be executed by processor one 134. In addition, the main memory one 135 may be used for storing temporary variables or other intermediate information during the execution of instructions by the processor one 134. The controller 16 further includes a read only memory one (ROM one) 136 or other static storage device (e.g., programmable ROM (PROM), erasable PROM (EPROM), and electrically erasable PROM (EEPROM)) coupled to the bus one 133 for storing static information and instructions for the processor one 134. Further, the controller 16 includes a plurality of I/O ports 131 that send and receive the control signals from the flow gauge 14, the control valve one 26, and control valve two 28.

The controller 16 also includes a communication interface one 132 coupled to the bus one 133. The communication interface one 132 provides a two-way data communication coupling to the transceiver one 12 and transceiver two 18. For example, the communication interface one 132 may be a network interface card to attach to any packet switched LAN. As another example, the communication interface one 132 may be an asymmetrical digital subscriber line (ADSL) card, an integrated services digital network (ISDN) card or a modem to provide a data communication connection to a corresponding type of communications line. Wireless links may also be implemented. In any such implementation, the communication interface one 132 sends and receives electrical, electromagnetic or optical signals that carry digital data streams representing various types of information.

Figure 14:
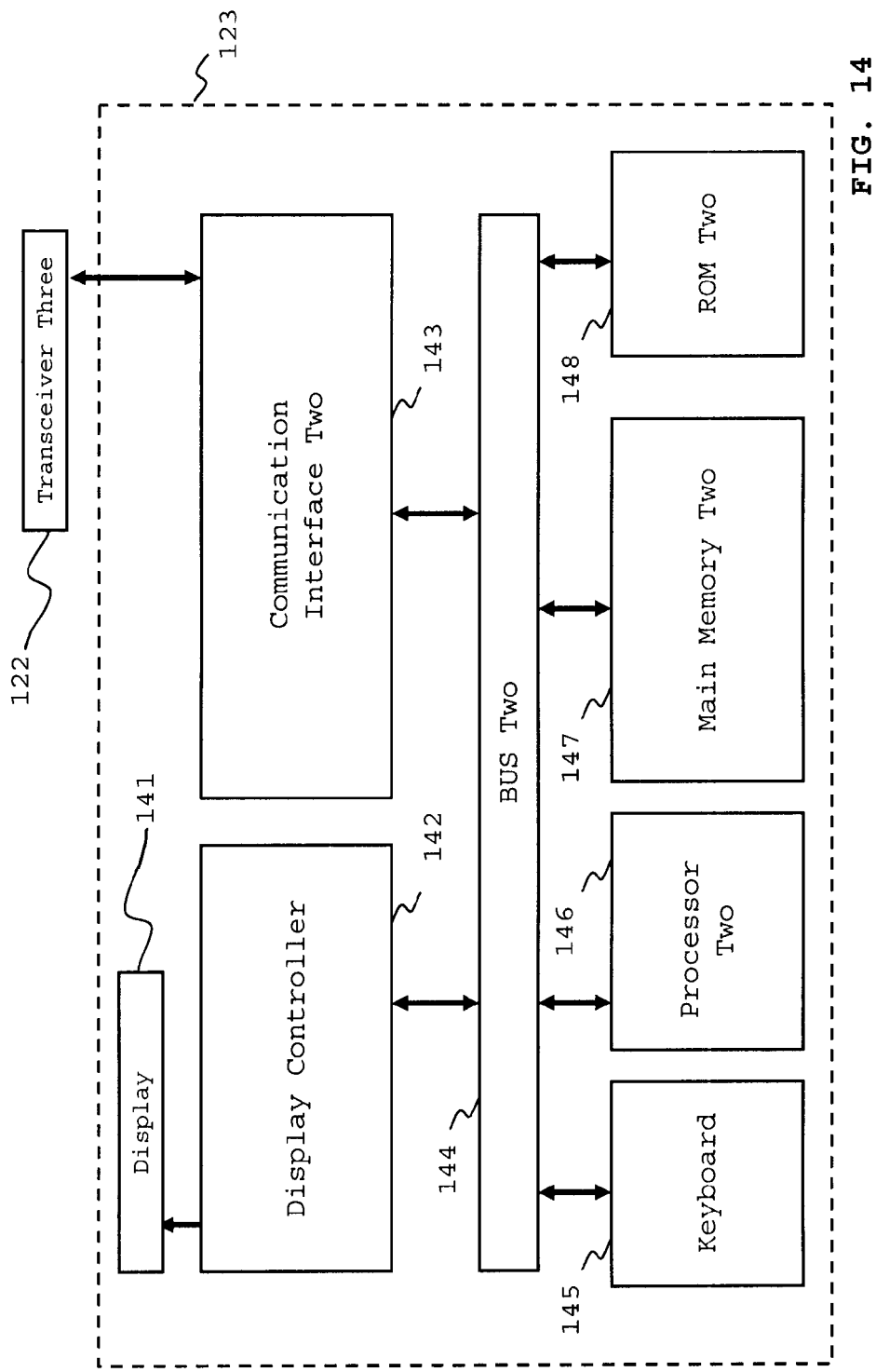
FIG. 14 is a block diagram of a consumer notification and setup unit in accordance with the present disclosure.

FIG. 14 illustrates the consumer notification and setup unit 123 in more details upon which an embodiment of the present disclosure may be implemented. The consumer notification and setup unit 123 includes a bus two 144 or other communication mechanism for communicating information, and a processor two 146 coupled with the bus two 144 for processing the information. The consumer notification and setup unit 123 also includes a main memory two 147, such as a random access memory (RAM) or other dynamic storage device (e.g., dynamic RAM (DRAM), static RAM (SRAM), and synchronous DRAM (SDRAM)), coupled to the bus two 144 for storing information and instructions to be executed by processor two 146. In addition, the main memory two 147 may be used for storing temporary variables or other intermediate information during the execution of instructions by the processor two 146. The consumer notification and setup unit 123 further includes a read only memory two (ROM two) 148 or other static storage device (e.g., programmable ROM (PROM), erasable PROM (EPROM), and electrically erasable PROM (EEPROM)) coupled to the bus two 144 for storing static information and instructions for the processor two 146.

The consumer notification and setup unit 123 also includes a communication interface two 143 coupled to the bus 144.

The communication interface two 143 provides a two-way data communication coupling to the transceiver three 122. For example, the communication interface two 143 may be a network interface card to attach to any packet switched LAN. As another example, the communication interface two 143 may be an asymmetrical digital subscriber line (ADSL) card, an integrated services digital network (ISDN) card or a modem to provide a data communication connection to a corresponding type of communications line. Wireless links may also be implemented. In any such implementation, the communication interface two 143 sends and receives electrical, electromagnetic or optical signals that carry digital data streams representing various types of information.

The consumer notification and setup unit 123 may also include a display controller 142 coupled to the bus two 144 to control a display 141, such as a cathode ray tube (CRT), a touch panel display, or a liquid crystal display (LCD) for displaying information to the consumer. The consumer notification and setup unit 123 includes input devices, such as a keyboard 145 for interacting with the consumer and providing information to the processor two 146. The touch screen display can also be used for interacting with the consumer and providing information to the processor two 146.

The transceiver one 12, transceiver two 18, and transceiver three 122 typically provide data communication through one or more networks to other data devices. For example, the transceiver one 12 may provide a connection to the data center 8 or the smart phone 2 through a network 6 (e.g., a LAN) or through equipment operated by a service provider, which provides communication services through the network 6. The network 6 uses, for example, electrical, electromagnetic, or optical signals that carry digital data streams, and the associated physical layer (e.g., CAT 5 cable, coaxial cable, optical fiber, etc). The signals through the various networks and the signals on the network 6 and through the transceiver one 12, transceiver two 18, or transceiver three 122, which carry the digital data to and from the controller 16 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The communication interface one 132 can transmit and receive data, including program code, through the network 6, the wireless network 111, and the signal conveying wired pipe 22 via transceiver one 12 and transceiver two 18. The communication interface two 143 can transmit and receive data, including program code, through the network 6, the wireless network 111, and the signal conveying wired pipe 22 via transceiver three 122. Moreover, the network 6 or the wireless network 111 may provide a connection to smart phone 2 through an smart phone application.

Figure 15:
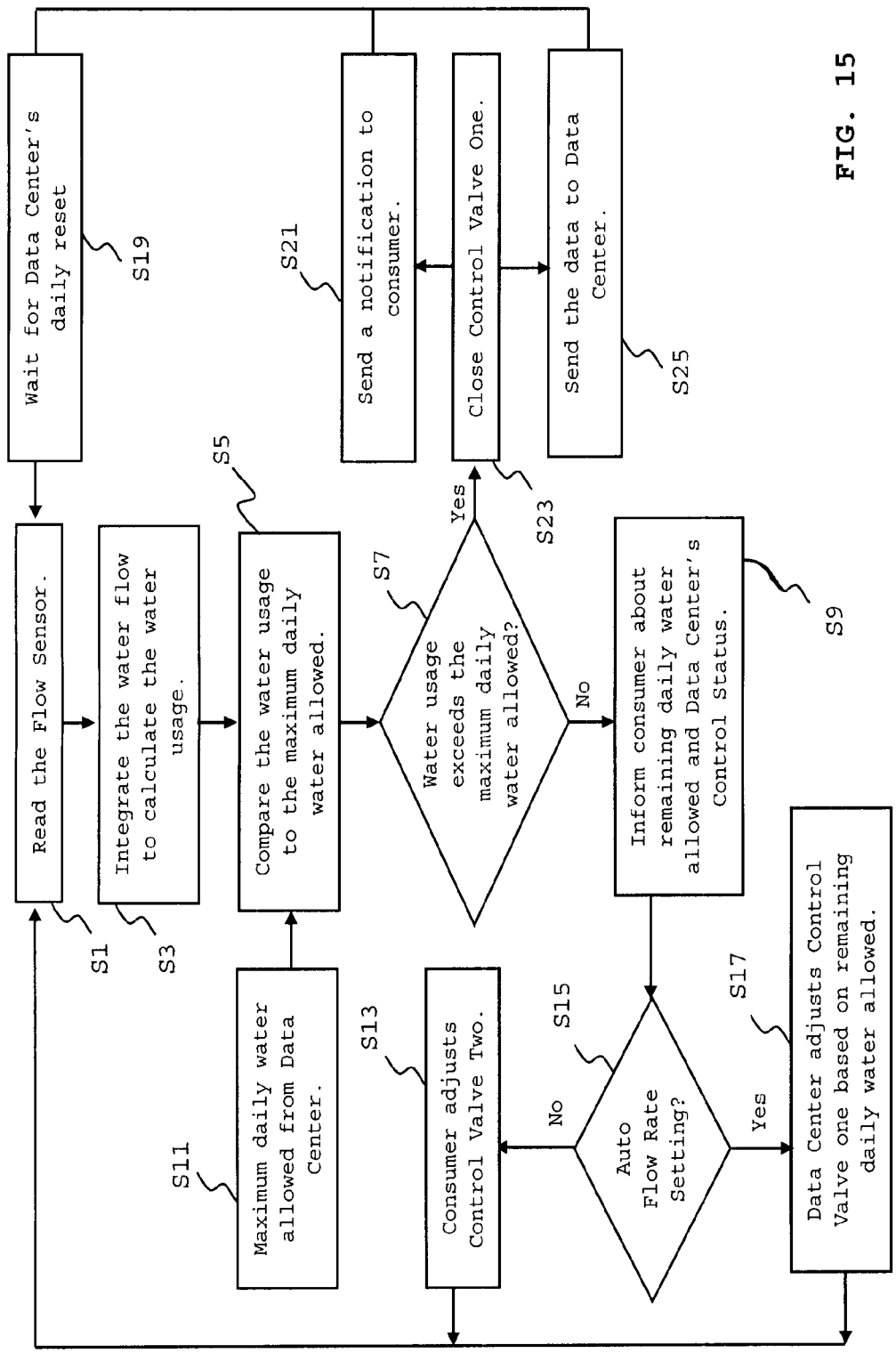
FIG. 15 is a process flow chart of the water rationing device that is connected to a data center and a consumer in accordance with the present disclosure.

FIG. 15 describes a process flow chart of the water rationing device 10. The data center 8 transmits to the water rationing device 10 a maximum daily water allowed for use by the house 101 that is stored in the controller 16 (operation S11). The maximum daily water allowed for use by the house 101 can be transmitted to the water rationing device 10 on hourly, daily, weekly, biweekly, or monthly basis. When water is used in the house 101, the flow sensor 20 senses the water flow and sends the water flow to the flow gauge 14 (operation S1). Volume of the water used in the house 101 is calculated by flow gauge 14 based on water usage and is stored in the controller 16. The flow gauge 14 calculates the volume of the water usage by integrating the water flow (operation S3). The controller 16 compares the water usage with the maximum daily water allowed (operation S5). If the water usage exceeds the maximum daily water allowed for the house 101 (operation S7), then the controller 16 closes the control valve one 26 (operation S23), sends a notification to the data center 8 (operation S25), and send a notification to the consumer via at least one of the smart phone 2, the personal computer 4, or the consumer notification and setup unit 123 (operation S21). In the event when the consumer has reached the maximum daily water allowed, the controller 16 waits for a reset signal (operation S19). The reset signal is sent on from the data center 8. As an alternative, the reset signal is generated based on an internal clock of the controller 16.

When the water usage of the house 101 is less than the maximum daily water allowed (operation S7), the controller 16 updates the smart phone 2, the personal computer 4, the data center 8, and the consumer notification and setup unit 123 with respect to a remaining daily water allowed (operation S9). By such an update, the consumer can access the above-noted devices to see the remaining daily water allowed. After updating, the controller 16 checks if the flow rate setting is on an auto or a manual setting (operation S15). In the event that the flow rate setting is on the auto setting, the controller 16 receives a data center's control signal from the data center 8 with regards to the adjusting the control valve one 26 (operation S17). On the other hand, if the flow rate is on the manual setting, the controller 16 receives the control signal from the consumer via the smart phone 2, the personal computer 4, or the consumer notification and setup unit 123 with regards to the adjusting the control valve two 26 (operation S13).

Figure 16:
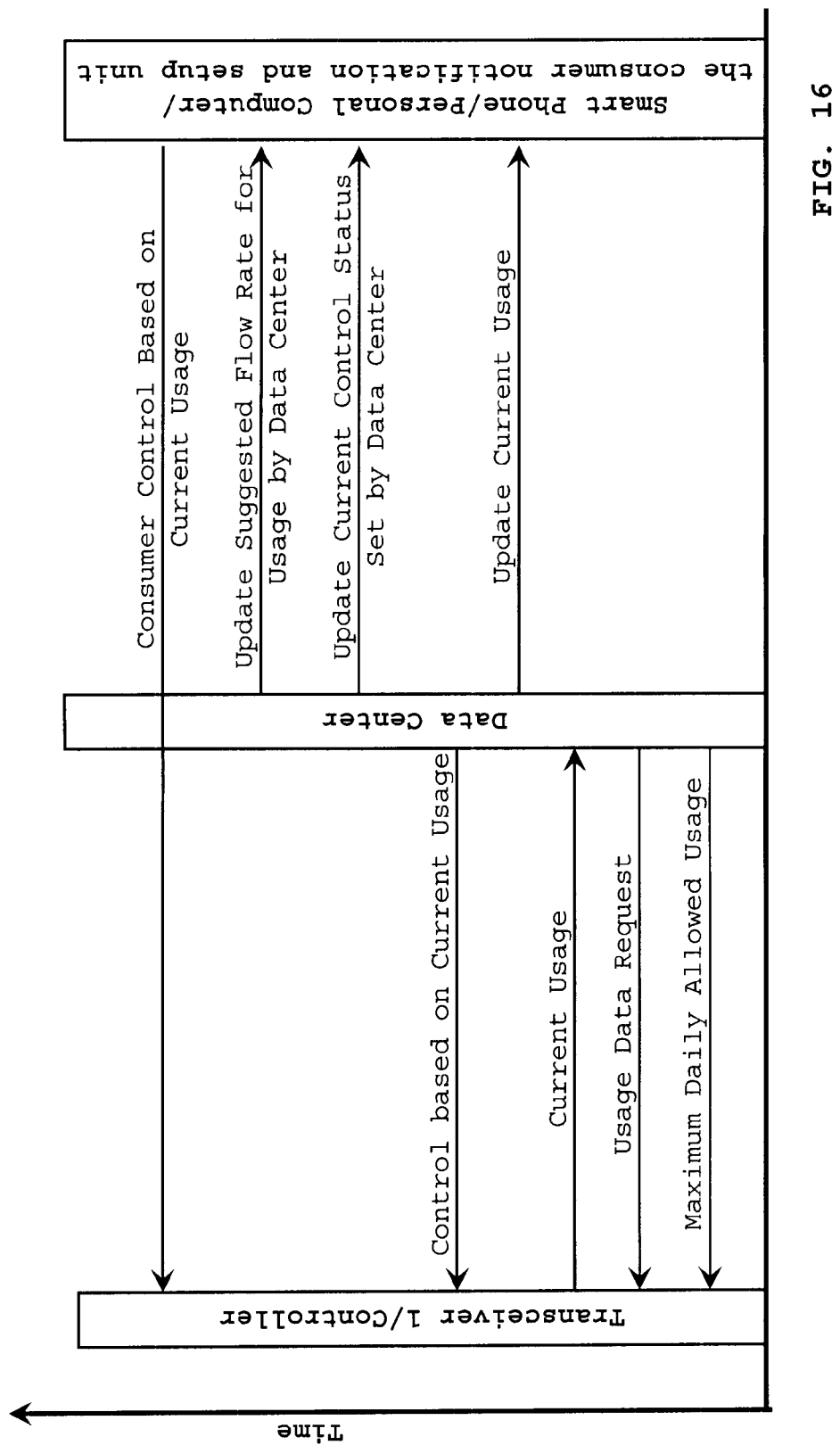
FIG. 16 is a signal flow diagram between a transceiver/controller, a data center, and a smart phone/personal computer in accordance with the present disclosure.

FIG. 16 illustrates a signal flow diagram between the controller 16 via the transceiver one 12, the data center 8, and the smart phone 2/the personal computer 4/the consumer notification and setup unit 123. First, data center 8 sends the maximum daily allowed usage to the controller 16 via the transceivers one 12. Second, the data center 8 sends a request to the controller 16 via the transceivers one 12 to receive from the water rationing device 10 the current water usage data. Third, the controller 16 via the transceivers one 12 sends the current water usage to the data center 8. Fourth, data center 8 updates the smart phone 2/the personal computer 4/the consumer notification and setup unit 123 with the current water usage in the house 101. Fifth, data center 8 sends the data center's control signal to the controller 16 via transceiver one 12. Sixth, data center 8 updates the smart phone 2/the personal computer 4/the consumer notification and setup unit 123 with the data center's control signal set by data center 8. Seventh, data center 8 updates the smart phone 2/the personal computer 4/the consumer notification and setup unit 123 with a suggested flow rate for use by data center 8. Eighth, the smart phone 2/the personal computer 4/the consumer notification and setup unit 123 sends the control signal based on the current water usage.

FIG. 17 illustrates a chart of parameters for the water rationing device 10 that is on the auto setting or the manual setting. When the flow rate is on the manual setting (i.e. the consumer adjust the water flow rate) the control valve one 26 remains fully open and the consumer has the option for adjusting the flow rate using the control valve two 28. In this scenario, data center 8 provides a suggested flow rate for control valve two 28 that can be used by the consumer in adjusting the control valve two 28. In other words, when the flow rate is on the manual setting, the control valve one 26 remains fully open, regardless of the remaining daily water allowed. On the other hand, when the flow rate is on the auto setting, the data center 8 control the flow rate of water via control valve one 26 according to the values provided in FIG. 17 and the control valve two 28 remains fully open. It should be noted that the values in the FIG. 17 are exemplary values and can be modified.

Figure 18:
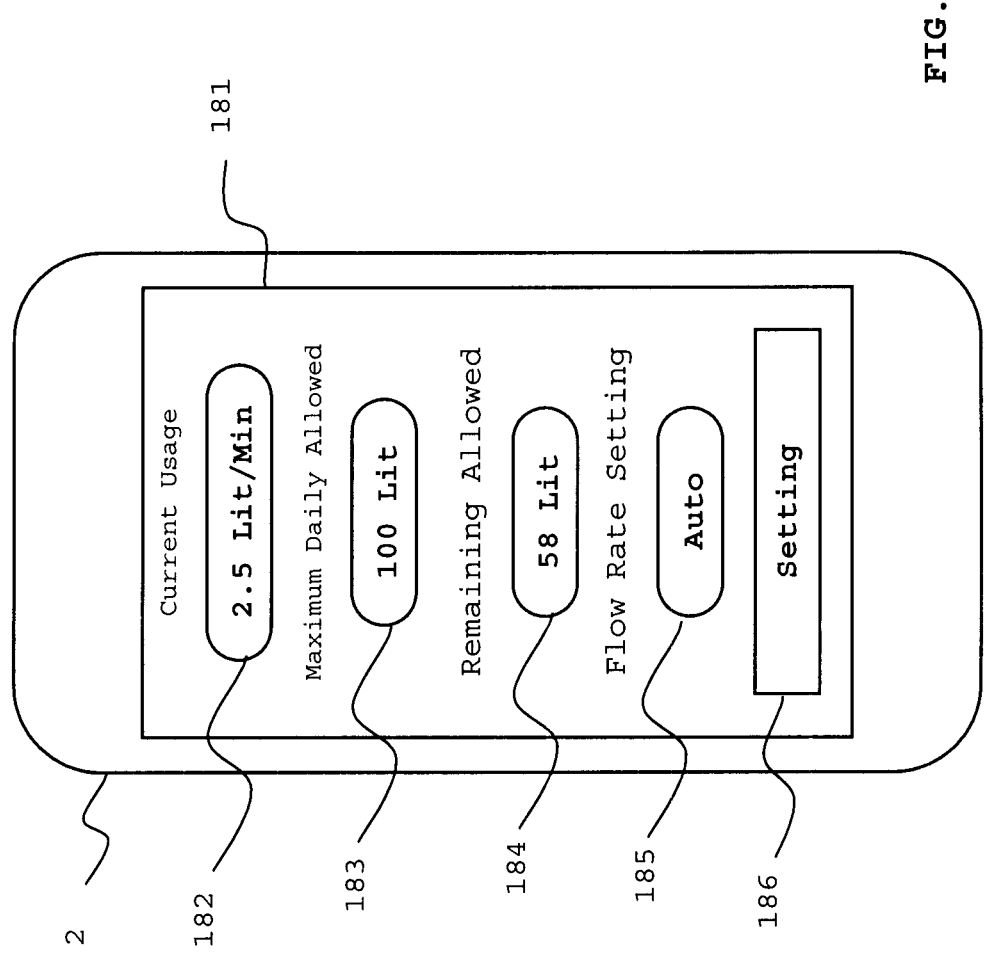
FIG. 18 is an exemplary smart phone application that is used with the water rationing device in accordance with the present disclosure.

FIG. 18 illustrates an exemplary smart phone application that is accessible using the smart phone 2 to use with the water rationing device 10. The smart phone 2 includes a smart phone touch screen display 181. The smart phone application illustrated in FIG. 18 includes a current usage section 182 that displays the water flow rate being used in the house 101; a maximum daily allowed section 183 that displays the maximum daily water allowed for the house 101; a remaining allowed section 184 that displays the remaining daily water allowed for the house 101; a flow rate setting section 185 that displays if the water rationing device 10 is on the manual or the auto setting; and a setting section 186 that is used to change the settings of the water rationing device 10.

The invention claimed is:

1. A water rationing device that controls and manages municipal household water usage, comprising:
   a signal conveying wired pipe that directs a water flow having a water inlet at one end, a water outlet at another end, an inner surface, an outer surface, and a plurality of electrically conductive wires placed between said inner surface and said outer surface that convey electrical power and electrical signals;
   a flow sensor coupled to said signal conveying wired pipe that senses said water flow passing inside said signal conveying wired pipe and outputs a water flow signal based on said water flow;
   a flow gauge that is connected to said flow sensor and measures a volume of said water flow based on said water flow signal from said flow sensor;
   a first control valve coupled to said signal conveying wired pipe that controls said water flow passing through said signal conveying wired pipe;
   a second control valve coupled to said signal conveying wired pipe that controls said water flow passing through said signal conveying wired pipe;
   a first pipe connector having a plurality of push connectors and coupled to said signal conveying wired pipe that makes electrical connection to said plurality of electrically conductive wires;
   a second pipe connector having a plurality of push connectors and coupled to said signal conveying wired pipe that makes electrical connection to said plurality of electrically conductive wires;
   a first transceiver connected to a controller that sends and receives signals;
   a second transceiver connected to said controller that transmits and receives signals;
   the controller connected to said flow gauge, said first control valve, said second control valve, said first transceiver, and said second transceiver that receives said water flow signal from said water flow gauge, sends and receives control signals to said first control valve and said second control valve, and sends and receives signals from said first transceiver and said second transceiver;
   a converter connected to said plurality of electrically conductive wires via said plurality of push connectors that converts voltage; and
   a power supply connected to said converter that stores electrical power and supplies the electrical power to said flow sensor, said flow gauge, said first transceiver, said second transceiver, said controller, said first control valve, and said second control valve.

2. The device of claim 1, wherein said controller communicates with a network via said first transceiver and said network is a wired or wireless network.

3. The device of claim 2, wherein said network is connected to at least one of a smart phone, a personal computer, or a data center that control said water rationing device.

4. The device of claim 1, wherein said first pipe connector connects said first transceiver to said at least one of said plurality of electrically conductive wires.

5. The device of claim 1, wherein said water outlet is connected to a water distribution pipeline of a house, and said water distribution pipeline of said house is made of said plurality of signal conveying wired pipes having said plurality of electrically conductive wires.

6. The device of claim 5, wherein said second transceiver via said second pipe connector of said water rationing device is connected to a third transceiver via a third pipe connector.

7. The device of claim 6, wherein said plurality of electrically conductive wires provide an electrical path between said first pipe connector, said second pipe connector, and said third pipe connector that are connected to said converter, said second transceiver, and said third transceiver, respectively.

8. The device of claim 7, wherein electrical power is provided from a power supply or a power line inside said house to said water rationing device via said electrically conductive wires.

9. The device of claim 8, wherein a voltage converter converts the voltage of said power supply or said power line to a voltage suitable for use in said electrically conductive wires.

10. The device of claim 1, wherein said water rationing device is connected through an electrical path to a consumer notification and setup unit, said consumer notification and setup unit comprising:
    A display controller that displays information;
    A communication interface that communicates with said third transceiver;
    A keyboard to input information;
    A processor that processes information;
    A main memory that stores information; and
    A read only memory that stores information.

11. The device of claim 10, wherein said water rationing device is controlled by said consumer notification and setup unit.

12. A water rationing method, implemented by a water rationing device of claim 1, for controlling and managing municipal household water usage, the method comprising:
    receiving a maximum allowed water usage from a data center;
    receiving a water usage information from a water volume measurement device;
    comparing said maximum allowed water usage to said water usage information;
    closing a first control valve and sending a notification, when said water usage information exceeds said maximum allowed water usage;
    generating a signal about said water usage information and a control status, when said water usage information does not exceeds said maximum allowed water usage;
    adjusting said first control valve when said control status is on a manual setting; and
    adjusting a second control valve when said control status is on an automatic setting.

13. The method according to claim 12, further comprising receiving said control status from a consumer.

\* \* \* \* \*

UNITED STATES PATENT AND TRADEMARK OFFICE
CERTIFICATE OF CORRECTION

Page 1 of 1

PATENT NO.         : 8,967,192 B2
APPLICATION NO.    : 13/532280
DATED              : March 3, 2015
INVENTOR(S)        : Yousef Dhahi Alonazy It is certified that error appears in the above-identified patent and that said Letters Patent is hereby corrected as shown below:

On the title page, Item (76), the Inventor's Middle Name is incorrect. Item (76) should read:

-- (76) Inventor: Yousef Dhahi Alonazy, Indiana, PA (US) --

Signed and Sealed this
Twenty-first Day of July, 2015

Michelle K. Lee
*Director of the United States Patent and Trademark Office*